(12) United States Patent
Singh et al.

(10) Patent No.: US 9,878,420 B2
(45) Date of Patent: Jan. 30, 2018

(54) METHOD OF CHEMICAL MECHANICAL POLISHING OF ALUMINA

(71) Applicants: SINMAT, INC., Gainesville, FL (US); UNIVERSITY OF FLORIDA RESEARCH FOUNDATION, INC., Gainesville, FL (US)

(72) Inventors: Rajiv K. Singh, Newberry, FL (US); Kannan Balasundaram, Gainesville, FL (US); Arul Chakkaravarthi Arjunan, Gainesville, FL (US); Deepika Singh, Gainesville, FL (US); Wei Bai, Gainesville, FL (US)

(73) Assignees: Sinmat, Inc., Gainesville, FL (US); University of Florida Research Foundation, Inc., Gainesville, FL (US)

( * ) Notice: Subject to any disclaimer, the term of this patent is extended or adjusted under 35 U.S.C. 154(b) by 0 days.

(21) Appl. No.: 15/341,130

(22) Filed: Nov. 2, 2016

(65) Prior Publication Data

US 2017/0072530 A1 Mar. 16, 2017

Related U.S. Application Data

(62) Division of application No. 14/450,885, filed on Aug. 4, 2014, now Pat. No. 9,551,075.

(51) Int. Cl.
*B24B 37/20* (2012.01)
*C23F 3/00* (2006.01)
*C09G 1/02* (2006.01)
*C09G 1/04* (2006.01)

(52) U.S. Cl.
CPC .......... *B24B 37/20* (2013.01); *C09G 1/02* (2013.01); *C09G 1/04* (2013.01); *C23F 3/00* (2013.01)

(58) Field of Classification Search
None
See application file for complete search history.

(56) References Cited

U.S. PATENT DOCUMENTS

| 6,340,374 | B1 | 1/2002 | Kato et al. | |
|---|---|---|---|---|
| 6,719,819 | B2 * | 4/2004 | Ota | B24B 37/044 106/3 |
| 2004/0266323 | A1 * | 12/2004 | Oshima | B24B 37/044 451/41 |
| 2007/0066065 | A1 | 3/2007 | Sugiyama | |

(Continued)

*Primary Examiner* — Allan Olsen
(74) *Attorney, Agent, or Firm* — Jetter & Associates, P.A.

(57) ABSTRACT

A CMP method uses a slurry including colloidal metal oxide or colloidal semiconductor oxide particles (colloidal particles) in water. At least one particle feature is selected from (i) the colloidal particles having a polydispersity >30%, and (ii) mixed particle types including the colloidal particles having an average primary size >50 nm mixed with fumed oxide particles having average primary size <25 nm. A substrate having an alumina surface is placed into a CMP apparatus, and CMP is performed with a rotating polishing pad and the slurry to polish the alumina surface. The polydispersity is determined by a polydispersity formula for a distribution width (w) involving width w1 and width w2 at a second larger particle size. The polydispersity formula= $(w2-w1) \times 100/dav$ which includes 63% of a total of the colloidal particles by volume and dav is an average particle size of the colloidal particles.

11 Claims, 2 Drawing Sheets

(56) References Cited

U.S. PATENT DOCUMENTS

| | | |
|---|---|---|
| 2007/0190911 A1* | 8/2007 | Shibuki .................. B24B 37/26 451/41 |
| 2008/0237535 A1* | 10/2008 | Maejima .................. C09G 1/02 252/79.1 |
| 2009/0202816 A1 | 8/2009 | Schlenoff |
| 2010/0159246 A1 | 6/2010 | Sakai et al. |
| 2012/0077419 A1 | 3/2012 | Zhang et al. |
| 2013/0161285 A1 | 6/2013 | Li et al. |
| 2013/0168348 A1 | 7/2013 | Li et al. |
| 2013/0171824 A1 | 7/2013 | Li et al. |
| 2013/0200038 A1 | 8/2013 | Li et al. |
| 2013/0200039 A1 | 8/2013 | Noller et al. |
| 2013/0248756 A1 | 9/2013 | Venkataraman et al. |
| 2014/0213057 A1 | 7/2014 | Li et al. |
| 2015/0017454 A1 | 1/2015 | Li et al. |
| 2015/0175864 A1 | 6/2015 | Takahashi et al. |
| 2015/0232728 A1 | 8/2015 | Takahashi et al. |
| 2015/0252237 A1 | 9/2015 | Ito et al. |

\* cited by examiner

METHOD OF CHEMICAL MECHANICAL POLISHING OF ALUMINA

CROSS REFERENCE TO RELATED APPLICATIONS

This divisional application claims the benefit of Non-Provisional application Ser. No. 14/450,885 entitled "CHEMICAL MECHANICAL POLISHING OF ALUMINA", filed on Aug. 4, 2014, now U.S. Pat. No. 9,555,075, which is herein incorporated by reference in its entirety.

FIELD

Disclosed embodiments relate to methods of chemical mechanical polishing (CMP) and slurries for polishing aluminum oxide including sapphire.

BACKGROUND

Aluminum oxide (alumina) is a chemical compound including aluminum and oxygen with the chemical formula $Al_2O_3$. Corundum is a crystalline form of alumina, generally with traces of iron, titanium and chromium. Sapphire is a variety of corundum ($\alpha$-$Al_2O_3$). Sapphire substrates are used for several applications including substrates for light emitting diodes (LEDs), transparent windows for infrared (IR) and visible wavelengths used in military imaging applications, and applications that require high strength and good optical transmission.

SUMMARY

This Summary briefly indicates the nature and substance of this Disclosure. It is submitted with the understanding that it will not be used to interpret or limit the scope or meaning of the claims.

Disclosed embodiments recognize there is a strong need to finish the surface of alumina substrates such as sapphire with a low surface roughness, and minimize polishing-generated crystalline defects that may occur in the near-surface regions. For crystalline alumina substrates, such defects can give rise to several problems such as poor epitaxial growth, bending of the plates due to relaxation of surface stresses, and/or premature mechanical failure of the crystalline alumina plate. Disclosed embodiments provide slurries and chemical mechanical polishing (CMP) methods that provide alumina substrates having low surface roughness, low density of near-surface region polishing-generated crystalline defects, while providing a relatively high alumina polishing rate.

DETAILED DESCRIPTION

Figure 1:
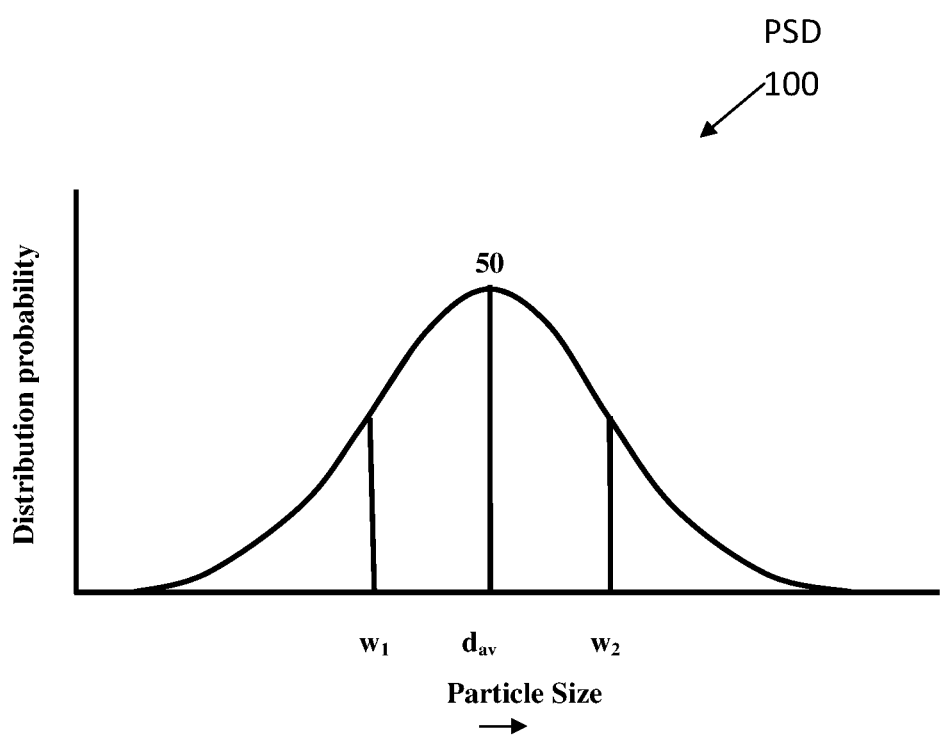
FIG. 1 depicts an example slurry particle size distribution showing a disclosed polydispersity in particle size, according to an example embodiment.

Embodiments of the invention are described with reference to the attached figures, wherein like reference numerals are used throughout the figures to designate similar or equivalent elements. The figures are not drawn to scale and they are provided merely to illustrate certain features. Several aspects of this Disclosure are described below with reference to example applications for illustration.

It should be understood that numerous specific details, relationships, and methods are set forth to provide a full understanding of the subject matter in this Disclosure. One having ordinary skill in the relevant art, however, will readily recognize that embodiments of the invention can be practiced without one or more of the specific details or with other methods. In other instances, well-known structures or operations are not shown in detail to avoid obscuring subject matter. Embodiments of the invention are not limited by the illustrated ordering of acts or events, as some acts may occur in different orders and/or concurrently with other acts or events. Furthermore, not all illustrated acts or events are required to implement a methodology in accordance with this Disclosure.

Notwithstanding that the numerical ranges and parameters setting forth the broad scope of this Disclosure are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5.

Disclosed embodiment relate to polishing of alumina surfaces of substrates including sapphire and related substrates using a slurry having coated or mixed particle types. The total concentration of particles in the slurry can vary from 0.1 wt. % to 60 wt. %. The alumina substrates can be single crystal, or polycrystalline where the size of the polycrystalline grains can vary from 1 nm to 1 mm. The single crystal alumina can be a sapphire substrate generally having any orientation, such as c-plane, a-plane, or r-plane, and can cut on-axis or be up to 20 degrees miscut from being on-axis. Also, disclosed embodiments include polishing other forms of alumina besides sapphire including sapphire doped with elements including transition metals such as Fe, Ti, Cu, and/or can include nitrogen to provide aluminum oxynitride (AlON), where the N content can vary from 0.1 mole % to 40 mole %.

The liquid phase of the slurry generally comprises a water phase. The pH of the slurry can be varied from 0.5 to 14.0, and more specifically from pH 6 to pH 13.0, such as from pH>7 to pH 12.0. In one embodiment the slurry particles include coated particles. To form coated particles for the slurry, core particles of silica or alumina, or transition metal oxides such as titania can be used. The size of the core particles can vary from 1 nm to 5 µm. In a specific example the core particles comprise silica, and the silica particle size can be varied from 10 nm to 500 nm, such as from 30 nm to 300 nm.

The coating on the core particles can be organic or inorganic with a thickness varying from 0.2 nm (2 Å) to 5 µm, such as 1 nm to 1 µm. The organic materials can contain positively charged atoms as a part of its constituents. Examples of positively charged organic materials include nitrogen-based compounds such as amines. The organic coating can also comprise nitrogen-based organic compounds, ketones, organic acids, and surfactants or surface active polymers. Such materials can be adsorbed to the particle surface in form of a monolayer, bilayer or multilayers. The organic coatings can be obtained by electrostatic interactions, hydrogen bonding or hydrophilic-hydrophilic interactions between the core particles and the coated layer. Examples of nitrogen-based compounds includes amines, such as methyl amine, ethylamine, bicine, tricine, and azoles. Examples of organic acids include carboxylic (—COOH group) and sulphonic ($SO_2OH$ group) including aliphatic and aromatic acids such as formic acid, acetic acid, lactic acid, citric acid, oxalic acid, uric acid, benzoic acid, tartaric acid, and amino acids.

Positively charged organic coatings on silica or other core particle surfaces is recognized to provide several benefits during the polishing process. Due to having a positive charge the organic material can be absorbed to negatively charged core particles such silica existing above a pH of about 2.4 and alumina above a pH of about 9. The positively charged organic molecules on the particles can also increase the particle's absorption to the negatively charged polishing pad. All these absorption effects are expected to increase the surface concentration of particles on the alumina substrate (e.g., sapphire) surface and on the polishing pad, thereby increasing the polishing rate of sapphire and related alumina materials during the polishing process. The organic coatings can also help in increasing the stability of the slurries such as a silica slurry which tends to gel under pH conditions of 4 to 9 under mild ionic strength. The concentration of organic additives can be from 0.001 gm/liter to 100 gm/liter. The term 'gm' is being used throughout this application as the unit for 'gram'. If excess organic raw materials are added to the slurry the organic material is generally present both as a coating as well as being dissolved in the liquid (e.g., water) phase.

As noted above the particle coating can also be an inorganic coating. The inorganic coating can be a transition metal compound coating on the core particles. The inorganic coating such as a transition metal compound coating can be present in addition to the organic coatings described above. The transition metal compound can comprise Ti, Fe, Mn, Cr, Cu, their oxides, nitrides or chlorides. The transition metal can have a valence between 0, +1, +2, +3, or +4. As noted above, the thickness of the coating can generally vary from 0.2 nm (2 Å) to 5 µm. The concentration of coated particles in the slurry can vary from 0.01 wt. % to 60 wt. %.

Disclosed transition metal compound coatings can assist polishing in several ways including increasing the alumina removal rate, reducing the friction during polishing, and making the slurry more stable. Transition metal coatings can help to accelerate the reactions between the alumina or alumina-like surface and the particle itself. For example, during the polishing process, compounds such as spinels can be formed on the alumina surface. Spinels such a magnesium aluminum silicate, iron aluminum silicate, or manganese alumina silicate and their related compounds can be formed. The formation of such compounds can increase the alumina polishing rate and reduce the friction during polishing.

The use of coated particles can also improve the stability of the slurry. For example, as noted above, the core silica particle surface is recognized to be susceptible to gelling. By coating the surface with transition metal compounds the gelling rate can be significantly reduced. Examples of the coatings that can decrease the gelling rate include transition metal compounds, such as Fe, Mn, Cu, Ti, Mg, Ce, or Mn.

Another inorganic coating embodiment uses alkali metals belonging to Group 1 (alkali metals) or Group II of the periodic table. Examples of Group I alkali metals include lithium, sodium, potassium, cesium, and Group II metals include beryllium, magnesium, calcium, and barium. Such coatings can be formed by physical adsorption of the ions of the respective elements. As the particles are generally negatively charged, a compact layer of the alkali metal or Group 2 coating can be formed at pH greater than 6 for silica core particles that are negatively charged. The thickness of such coating is generally in the range of 0.1 nm to 5 nm. By adding soluble salts of the Group I and Group II elements, such coatings can be formed. Example of soluble salts of Group I and Group II includes sulfates, silicates, carbonates, chlorides, nitrates, nitrides, phosphate, and bicarbonate. The concentration of salts can vary from 1 ppm to 10 wt. %. Such coatings may help to decrease the friction during the alumina polishing process.

Disclosed mixed slurry particles can comprise 2 or more particle types, including different compositions such as silica mixed with one and more other non-silica oxide particles such as alumina or titania, or 2 or more particle types of same composition (e.g., silica) but having different size distributions, or 2 more particle types of same composition but having different shapes or fractal dimensions. Other mixed slurry particle types include 2 or more particle types of same composition but having different surface area or different porosity distributions, 2 or more particles types of same composition but made using different manufacturing processes leading to different structural properties characteristic for the respective manufacturing processes, such as, silica made from 2 or more of different inorganic precursors such as sodium silicate to form colloidal particles, a sol-gel process and a fumed process to form fumed oxide particles. Another mixed particle type is the same composition but with one of the particle types having different surface groups which can comprise in the case of silica particles different concentrations of silanol, silodoxane, vicinal or germinal or organic groups thereon.

Colloidal silica particles are defined as particles made from silicate-based precursors such as sodium silicate and potassium silicate, with colloidal titania or colloidal alumina made from similar precursors. Colloidal silica is known to have bound hydroxyl ions ($OH^-$) which impart a negative charge under neutral pH conditions. The colloidal particles generally have $D_f$ values between 2.6 to 3.0.

Sol-gel particles are defined as particles made from organic precursors such as tetraethyl ortho silicon (TEOS), or tetramethyl ortho silicon (TMOS) for silica. Both colloidal silica and sol-gel silica are manufactured in liquid environments with maximum temperatures generally not exceeding 200° C. The basic structure or morphology sol-gel silica (or sol-gel titania or alumina) solid phase can comprise discrete colloidal particles to continuous chain-like polymer networks. Disclosed embodiments utilize sol-gel derived discrete colloidal particles, which as described above have characteristic loosely bound hydroxyl ions which impart a negative charge under neutral pH conditions. The sol-gel particles generally have $D_f$ values between 2.6 to 3.0.

Fumed silica is also known as pyrogenic silica because it is produced in a flame. Fumed silica are generally made from a vapor phase reaction by oxidation of silicon tetrachloride or related precursors. The processing temperatures for fumed silica significantly exceeds 200° C., such as >1,000° C. Fumed silica has a characteristic structure being microscopic droplet shaped amorphous silica particles fused into branched, chainlike, three-dimensional secondary particles which then agglomerate into tertiary particles. The primary particle size for fumed silica is generally 5 nm to 50 nm. Fumed silica particles have characteristic fractal dimension (Df) values generally ranging from 1.6 to 2.6.

Colloidal silica and sol-gel silica, typically comprise individual primary particles with loose agglomeration of primary particles. The term agglomeration refers to weak physical van der Waals bonding between the particles. In contrast fumed particles comprise strongly chemical bonded primary particles called aggregates as these process occurs at high temperatures. These aggregates can form larger agglomerates by weak Van der Waals interaction between the aggregates. The primary particle size of fumed silica, titania, or alumina or mixed products can range from 2 nm to 150 nm, while the aggregate size can range from 50 nm to 1,000 nm (1 micron), while the agglomerate size can range from 50 nm to 5 microns. The surface area of the fumed particles can range from 30 $m^2/gm$ to 500 $m^2/gm$, while the porosity of the agglomerates can range from 99.99% to 10% by volume.

The shape of the colloidal, sol-gel or fumed particles can be defined by their characteristic dimension $D_f$ which is defined by:

$$N_{pp}=K'(d_m/d_{pp})D_f$$

where $N_{pp}$ are the number of primary particles in the aggregate or the agglomerate, $d_m$ is the maximum dimension of the aggregate, and $d_{pp}$ is the average primary particle size of the aggregate. Similar analysis can be applied to agglomerates. The value of $D_f$ defines the shape and the porosity of the aggregate or agglomerate. A value of $D_f$ close to 1.0 refers to a linear shaped aggregate/agglomerate, while a value of 3.0 refers to a spherical shaped aggregate/agglomerate. $D_f$ can generally have and any value between 1.0 and 3.0. Fumed oxide particle aggregates can have $D_f$ values ranging from 1.5 to 2.6, while colloidal or sol-gel particles have agglomerates can have $D_f$ values ranging from 2.6 to 3.0.

In one embodiment the colloidal silica or sol-gel silica particles can be mixed with fumed oxide particles, such as fumed oxide particles having Df values ranging from 1.3 to 2.6. The ratio of mixing of colloidal or sol-gel silica particles to fumed oxide particles can vary from 1000:1 to 1:100. The average primary particle size of the colloidal or sol-gel silica particles can vary from 5 nm to 500 nm, while the average primary size of the fumed oxide particles can vary from 1 nm to 100 nm. The surface area of the colloidal silica or sol-gel silica particles can vary from 10 $m^2/gm$ to 500 $m^2/gm$, while the surface area of the fumed particles can vary from 50 $m^2/gm$ to 600 $m^2/gm$. Typically the surface area of fumed oxide particles is higher by at least 10% than the surface area of colloidal or sol-gel silica particles. The volume porosity of the colloidal or sol-gel silica particles can vary from 0.01% to 60%, while the volume porosity of the fumed agglomerates can vary from 10% to 99.99%.

Slurries having disclosed mixed particle types have several advantages compared to conventional single type (unmixed) slurry particles. For example, by mixing particles of sol-gel or colloidal silica with fumed particles, the particle size distribution is widened. This is recognized to increase the polydispersity of the slurry particles. A wide particle size distribution has been recognized to increase the packing of particles when the mixed particle slurry is fed onto the pad on the CMP machine, which increases the number of polishing particles interacting with the alumina surface. This results in higher polishing rates compared to conventional unmixed slurry particles.

Additionally, by mixing sol-gel or colloidal silica particles with fumed oxide particles in the slurry, the higher surface area of fumed particles compared to the sol-gel and colloidal silica particles also results in also a higher number of polishing sites interacting with the alumina (e.g., sapphire) surface, thus leading to higher polishing rates. Moreover, as fumed particles have a non-spherical surface with Df values between 1.5 to 2.6, the addition of these particles can increase local pressure during the polishing process. The electrical conductivity of mixed particle-based silica slurries using colloidal silica and fumed silica can range from 0.2 milliSiemens (mS) to 7 mS. One electrical conductivity range is between 0.5 mS to 2.5 mS.

As noted above, the core or coated particles or mixed particles can be a mix of 2 or more size distributions. For example, 200 nm (mean size) silica core particles can be mixed with particles having a mean size of 50 nm or less, or 100 nm mean size core particles can be mixed with core particles having a mean size of 75 nm or less. The mixing ratio (by weight) of the larger to smaller particle types can vary of 1:20 to 100:1. The mixing size ratio (by weight) between larger and smaller particle types can vary from 1 to 1.2 to 1:200. The weight ratio of mixing between large and small particles can vary from 100:1 to 1:100. As noted above, by mixing larger and smaller particle types the packing of the particles can be increased as particles can more efficiently occupy interstitial spaces and thus more particles will be interacting with the alumina surface during the polishing process, and this will generally lead to increase in removal in rates during polishing.

Another disclosed embodiment polishes sapphire (e.g., a-plane, c-plane, r plane) with a slurry including mixed particle types with different surface groups and different surface areas. For example, silica particles of different surface areas per unit mass varying from 10 $m^2/g$ to 1000 $m^2/gm$ can be used. As another example, a colloidal silica slurry made by the sodium silicate process can be mixed with at least one fumed silica or other metals oxides (alumina, titania, iron oxide or transition metal oxide) formed by a vapor phase (fumed) process. The colloidal silica can have a surface area per unit mass varying from 10 $m^2/gm$ to 200 $m^2/gm$ while the fumed silica can have a surface area per unit mass varying from 50 $m^2/gm$ to 600 $m^2/gm$. The surface area per unit mass ratio of colloidal particles to fumed oxides particle can vary from 0.05 to 10. The concentration of each particle type can vary from 0.1 wt. % to 40 wt. %. By mixing different particle types the polydispersity of the particles in the slurry can be increased leading to increased removal rate of sapphire.

Another embodiment for polishing alumina (e.g., sapphire) of any face uses mixed particle types of given surface groups. More specifically this embodiment includes polishing with a mixture of hydrophobic and hydrophilic groups. Examples of surface groups in silica include silanol groups, siloxane (organic), vicincal or germinal silica groups Surface groups with —OH (silanol) groups are typically hydrophilic, while siloxane groups (organic) are typically hydrophobic. In an example mixed silica particle system, at least 2% of the surface groups have an organic surface modification.

Another disclosed embodiment comprises the slurry having a wide distribution of particle size. FIG. 1 depicts an example slurry particle size distribution (PSD) 100 showing a disclosed polydispersity in particle size, according to an example embodiment. PSD 100 is based on the volume distribution (not the number distribution). The width of the particle distribution is defined by the distribution width (w) with w1 and w2 shown defining the bounds of w (=w2−w1). The average particle size is shown as dav. The value "(dav−w1)" defines the lower width of particle size distribution which contains 31.5% of the volume of particles compared to total particles in the slurry by volume. The value "(w2−dav)" defines the upper width of PSD 100 which contains 31.5% of the particles (compared to total particles) by volume. Thus within the range (w2−w1), the slurry contains 63% of the particles compared to total particles by volume. If the PSD is symmetrical it is expected that (dav−w1)=(w2−dav).

The distribution of the core, coated or mixed particle types can have a polydispersity defined by (w2−w1)×100/$d_{av}$, with a polydispersity value that lies between 5% and 200%. Disclosed embodiments include a polydispersity value between 10% and 200%, and a polydispersity value of at least 30%, such as between 30% and 200%. It is recognized by having a broad distribution in particle size (a polydispersity value ≥5%, such as a value ≥30%) leads to better packing of the particles thus increasing the alumina/sapphire CMP removal rate.

The slurry's liquid phase may contain single, double or triple charged anions and cations. Examples of singly charged ions include alkali metal ions such as sodium, potassium, ammonium, halide, carbonate, and sulfate. The concentration of the ions can vary from 5 ppm to 5 wt. %. Single charged cations, and single and double charged anions can provide better performance compared to other ionic species because it is recognized higher charged ions (ion charges >1) can destabilize the slurry. Increasing the concentration of ions to a particular value can decrease the electrostatic repulsion double layer, thus helping to enhance the CMP removal rate. However, a high concentration of ions (>5 wt. %) can cause destabilization of the slurry. The electronic conductivity of the slurry which is a measure of ion concentration should generally not exceed 10 mS. The electrical conductivity of silica particles with polydispersity greater than 20% can range from 0.2 mS to 7 mS. One example range of electrical conductivity is between 0.5 mS to 2.5 mS.

The slurry can also contain one or more surfactants. The surfactants can be non-ionic, anionic, cationic, zwitterionic or amphoteric. The concentration range for surfactants can be from 0.01 gm/liter to 30 gm/liter. The slurry can also include one or more oxidizers with a concentration of 0.01 gm/liter to 100 gm/liter, such as 10 gm/liter to 100 gm/liter. The use of oxidizers for particle coating can help in controlling the ionic strength and also some other helpful effects such as improving the particle stability, and modulating the friction during polishing. A low concentration of oxidizers can breakdown within the slurry and coat the surface of the core particles with insoluble compounds which can help in reducing friction and increasing the CMP removal rate. In addition, some oxidizers can act as a fungicide to reduce organic growth if the slurry is stored for an extended period of time. Examples of oxidizer include per-compounds. The concentration of oxidizers can vary from 0.01 gm/liter to 100 gm/liter, such as 2 gm/liter to 50 gm/liter.

The oxidizer can comprise a per-compound. A per-compound is a compound that includes an element in its highest oxidation state. The per-compound can include peroxides such as hydrogen peroxide, ammonium cerium nitrate, periodates, periodic acid, iodates, persulfates, chromates, permanganates, ferricyanides, bromates, perbromates, ferrates, perrhenates, or perruthenates.

The slurry can also include pH stabilizers. Both organic and inorganic pH stabilizers can be used. Examples of inorganic pH stabilizers include phosphate, phthalates, bicarbonates, silicates. Examples of organic pH stabilizers include amines, glycine, N-Cyclohexyl-2-aminoethanesulfonic acid.

As noted above, the slurry can also include a fungicide. Examples of fungicides include tetramethylammonium chloride, tetraethylammonium chloride, tetrapropylammonium chloride, alkylbenzyldimethyl ammonium chloride, and alkylbenzyldimethylammoniumhydroxide, 3,5-dimethyl tetrahydro 1,3,5,2H-thiadiazine-2 thione, 2-methyl-4-isothiazolin-3-one and 5-chloro-2-methyl-4-isothiazolin-3-one, sodium chlorite and sodium hypochlorite.

The polishing process can be performed at a temperature of from 15° C. to 100° C. Higher temperatures are expected to increase the polishing rate of sapphire and related alumina compounds. One temperature range is 25° C. to 65° C. Disclosed coated particles are generally more suitable for a higher temperature range because they are expected to be more stable, and if they have a higher reactivity surface, the CMP removal rate at higher temperatures is expected to significantly increase. One way to reach a higher temperature is to preheat the slurry before being supplied to the CMP apparatus.

Regarding the polishing pad, any type of polymer-based polishing pad can generally be used. Examples of polishing pads are based on polyurethane pads and suede pads. The pad thickness can vary from 0.1 mm to 25 mm. The hardness of the suede pads can vary from Asker C hardness of 5 to Asker Hardness of 95. The compressibility of the suede pad can be from 0.1% to 40%. The pore size of the suede poromeric pads can vary from 2 microns to 100 microns with the size in the range of 20 to 60 microns in one embodiment. The poromeric pad layer can have a backing pad layer of poly(ethylene terephthalate) (PET), or foam or non-woven material with thickness between 30 microns to 25 mms. Poromeric suede pads are expected to have positive charge at pH 7 to 10 can be used. The positive charged surfaces can attract negatively charged particles such as mixed silica or coated silica particles which can increase the number of particles interacting with the alumina (e.g., sapphire) surface. This is expected to lead to higher CMP removal rates.

Besides use of poromeric pads, polyurethane pads can be used. Examples of polyurethane based pads include D-100 pads from Cabot Microelectronics, IC and Suba Series from Dow Electronics Materials. The hardness of these pads range from Shore D value of 5 to 99. The porosity of such pads can vary from 0.1% to 40%. It is noted that generally any other type of polymeric material can be used with the slurry. Besides the use of poromeric pads, metal pads (such as cast iron, copper, tin), granite, or resin surfaces can be also used as pads.

Figure 2:
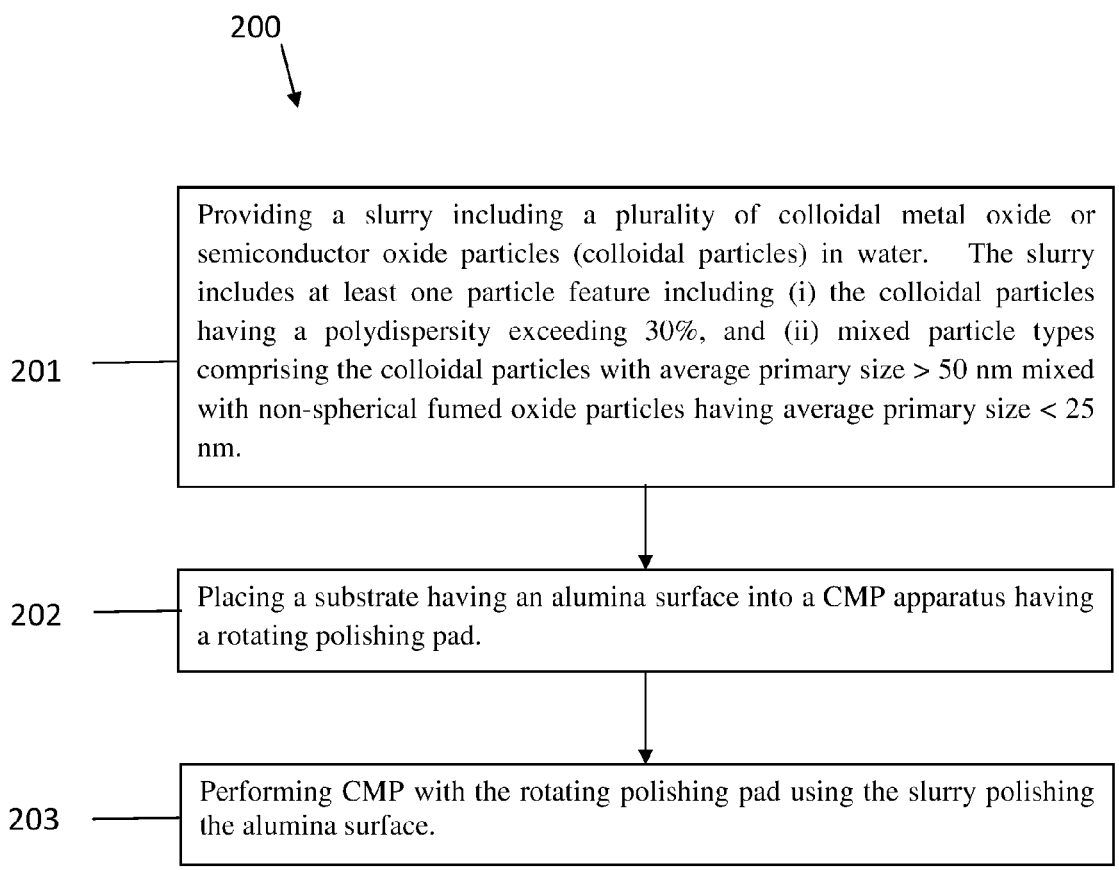
FIG. 2 is a flow chart that shows steps in an example CMP method for polishing an alumina surface of a substrate, according to an example embodiment.

FIG. 2 is a flow chart that shows steps in an example CMP method 200, according to an example embodiment. Step 201 comprises providing a slurry including a plurality of colloidal metal oxide or colloidal semiconductor oxide particles (colloidal particles) in water. The colloidal particles can comprise silica, titania, or alumina. The pH of the slurry can optionally be alkaline (pH>7), such as a pH from 7.1 to 14.

The slurry includes at least one particle feature selected from (i) the plurality of colloidal particles having a polydispersity exceeding 30%, and (ii) mixed particle types comprising the plurality of colloidal particles having average primary particle size >50 nm mixed with fumed oxide particles having an average primary particle size <25 nm. Other features can optionally include a coating on the colloidal particles including Group I ions, Group II ions, transition metal oxide, or an organic material, and the colloidal particles having a surface area per unit mass <100 $m^2/gm$ mixed with fumed oxide particles having an average surface area per unit mass >150 m²/gm. Step 202 comprises placing a substrate having an alumina (e.g., sapphire) surface into a CMP apparatus having a rotating polishing pad. Step 203 comprises performing CMP with the rotating polishing pad using the slurry polishing the alumina surface.

EXAMPLES

Disclosed embodiments are further illustrated by the following specific Examples, which should not be construed as limiting the scope or content of this Disclosure in any way.

Example 1

A colloidal silica-based slurry was used to polish sapphire substrates. The polishing was conducted on a single sided polisher with a pressure of 7 psi and suede pads 12 inches in size with a rotation of 150 rpm on a Buehler table top polisher. Sapphire substrates of different orientations (c-plane, a-plane and r-plane) were polished. The suede pads had a pore size in the range of 20 to 80 µm. The particle size distribution was determined using dynamic light scattering measurements. The % polydispersity was measured by calculating $(w2-w1)/d_{av} \times 100$ as described above with data shown in Table 1 below.

The concentration of silica particles was measured using density measurements. The friction during polishing was measured by characterizing the temperature increase during the polishing process. Based on the temperature increase under fixed mechanical loading (pressure and velocity), the friction was separated into 5 categories with alpha numeric characters with 5 being the highest friction and 1 being the lowest friction. The silica particles were coated by transition metal oxides (e.g. manganese oxides, copper oxide etc.) with a coating thickness of less than 1 micron such as 0.01 micron to almost 1 micron. The coatings when used were discontinuous so that the both coating and silica particle had exposed surfaces (a silica surface and transition metal oxide surface). The transition metal oxide coatings were made by reducing the metallic salts in presence of colloidal silica particles. The defectivity on the sapphire surface after polishing was measured by measuring the presence of scratches using an atomic force microscope. The pH of the polishing slurry was 9.5.

The results above in Table 1 evidence that increasing polydispersity significantly increases the removal rate for c-plane and a-plane sapphire polishing. The presence of transition metallic oxide coatings decreased the friction during the polishing process. Similar results were obtained when the pH of the slurry was varied from 7.0 to 12.0, and when the concentration of particles varied from 1 wt. % to 50 wt. %. The density of crystal defects was found to decrease with higher polydispersity.

Example 2: Effect of Inorganic Material Coated Particles by Using Group I and Group II Elements This Example shows the role of silica particles with a compact bi-layer of Group I or Group II elements on polishing. For Group II coatings, the coatings were formed by adding a salt of Group II metals. The coatings of Group I and Group II were done by electrostatics as Group 1 (alkali) metals and Group 2 metals have a net positive charge which are attracted to the silica surface with has a new negative charge. The thickness of the coating layer of Group I and Group II was less than 10 nm such as 1 nm to 4 nm. Examples of coatings made by this process include Group I elements such as sodium and lithium, potassium, and Group II elements included magnesium.

Salts can generally be of any form including nitrates, chlorides, carbonates, silicates, sulfates, phosphates that can have, single, double or triple charged anions. The compactness of the coating was found to depend on the atomic size of the cations. For example, $Na^+$ ion has an atomic size of 1 Å, while $K^+$ ions has an atomic size of 1.4 Å, so it is expected that the $K^+$ coating will be less compact than the $Na^+$ ion coating. The concentration of Group I and Group II ions in the slurry can vary from 5 ppm to 2 weight %. It is noted that the slurry dispersion can be effected by the ion concentration. The slurry was characterized as stable or unstable depending on the concentration of the Group I and Group II ions.

For these experiments, a colloidal silica particle based slurry was used to polish sapphire (c-plane, a-plane and r-plane) substrates. The polishing was conducted on a single sided polisher with pressure of 7 psi and suede pad (12 inch size) with a rotation of 150 rpm on a Buehler table top polisher. The suede pad had a pore size in the range of 20 to

TABLE 1

| Avg. size (nm) | Polydispersity (%) | Coating | Conc. (wt. %) | Orientation | MRR (nm/hr) | Friction | Defectivity |
|---|---|---|---|---|---|---|---|
| 50 | 20 | none | 3 | c-plane | 760 | 6 | Y |
| 50 | 40 | None | 5 | c-plane | 980 | 4 | Y |
| 50 | 40 | None | 20 | c-plane | 3915 | 4 | N |
| 50 | 40 | $MnO_2$ | 20 | c-plane | 4510 | 2 | N |
| 50 | 100 | $MnO_2$ | 20 | c-plane | 4950 | 1 | N |
| 50 | 40 | None | 45 | c-plane | 2860 | 3 | N |
| 50 | 40 | None | 20 | r-plane | 1420 | 2 | N |
| 50 | 40 | $MnO_2$ | 20 | a-plane | 970 | 2 | N |
| 50 | 40 | None | 20 | a-plane | 1290 | 4 | N |
| 50 | 80 | None | 20 | a-plane | 1530 | 3 | N |
| 80 | 10 | None | 20 | c-plane | 3930 | 3 | N |
| 80 | 40 | $MnO_2$ | 20 | c-plane | 4940 | 1 | N |
| 80 | 40 | $CuO/Cu_2O$ | 20 | c-plane | 4560 | 2 | Y |
| 80 | 80 | None | 20 | c-plane | 4390 | 2 | N |
| 80 | 100 | None | 20 | c-plane | 5470 | 1 | N |
| 140 | 40 | None | 20 | a-plane | 1840 | 3 | N |
| 140 | 40 | $MnO_2$ | 20 | a-plane | 2130 | 1 | N |
| 140 | 80 | None | 20 | c-plane | 5200 | 2 | N |
| 140 | 150 | None | 20 | a-plane | 2420 | 1 | N |
| 180 | 40 | None | 5 | a-plane | 2240 | 1 | N |

100 microns. 80 nm silica particles with a polydispersity of greater than 30% were used for the experiments. The pH of the slurry was kept at 9 during the polishing process.

The stability of the slurries was visually measurements after adding the Group I and Group II additives and waiting for 30 minutes to observe whether there was settling of the particles or an increase in the viscosity of the slurry. The results obtained in Table 2 below showed that Group I additives increased the removal rate of both a-plane and c-plane sapphire substrates, with no substantial difference in stability of the slurry. In contrast, a higher amount of Group II additives substantially decreased the stability of the slurry. The unstable slurries also gave rise to defectivity on the sapphire surface (example $Mg^{2+}$ coated silica particles).

TABLE 2

| Type | Concentration | Orientation | Removal rate (nm/hr) | Stability |
|---|---|---|---|---|
| None | 0 | A-plane | 960 | Stable |
| Na+ | 0.003 wt % | a-plane | 1540 | stable |
| K+ | 0.0015 wt % | a-plane | 1150 | stable |
| $Mg^{2+}$ | 0.01 wt % | c-plane | 3110 | not stable |
| $MnO_2$/Na+ | 0.05 wt % | c-plane | 4980 | stable |
| Li+ | 0.15 wt % | a-plane | 1270 | stable |
| $Ba^{2+}$ | 0.05 wt % | a-plane | 1010 | stable |

Example 3: Effect of Organic Coatings

Organic coatings on colloidal silica cores were evaluated for polishing performance. As the colloidal silica particles are negatively charged, positively charged organic molecules were added so that a coating could be formed. Examples of positively charged ions include amines and other molecules with a nitrogen atom. Other examples of positively charged compounds include ammonium ions, and TMAH (trimethyl ammonium hydroxide) with a concentration generally less than 0.1 M/liter. For these experiments, a colloidal silica based slurry was used to polish sapphire (c-plane and a-plane and r-plane) substrates. The polishing was conducted on a single sided polisher with pressure of 7 psi and suede pad (12 inch size) with a rotation of 150 rpm on a Buehler table top polisher. Sapphire substrates of different orientations were polished. The suede pad has a pore size in the range of 20 to 100 microns. 80 nm particles with polydispersity of greater than 20% were used for the experiments. The pH of the slurry was kept at 9 during the polishing process. The polydispersity of the colloidal silica particles was greater than 30%.

TABLE 3

| Organic Compound | Concentration | Orientation | Removal rate (nm/hr) | Defectivity |
|---|---|---|---|---|
| None | 0% | A-plane | 960 | N |
| Methyl amine | 0.01 wt % | c-plane | 4130 | N |
| Tricine | 0.0025 wt % | c-plane | 4560 | N |
| Ethyl amine | 0.01 wt % | a-plane | 1910 | N |
| Thiazole | 0.01 wt % | c-plane | 3810 | N |
| Pyrazole | 0.01 wt % | a-plane | 2010 | N |
| Ethyl amine | 0.01 wt % | r-plane | 1780 | N |

The results in Table 3 above show that the sapphire removal rate was significantly increased compared to no organic additives. Furthermore the surface defectivity was also improved (not shown in Table 3) when such additives were added. The surface roughness (Ra) decreased by approx. 0.2 A (from 1.8 A to 1.6 A) when 0.01 wt. % of methyl amine was added.

Example 4: Effect of pH

In this polishing Example the pH of the slurry was varied from 7 to 12. For these experiments, a colloidal silica based slurry was used to polish sapphire (c-plane and a-plane and r-plane) substrates. The polishing was conducted on a single sided polisher with pressure of 7 psi and suede pad (12 inch size) with a rotation of 150 rpm on a Buehler table top polisher. Sapphire substrates of different orientations were polished. The suede pad has a pore size in the range of 20 to 100 microns. 80 nm particles with polydispersity of greater than 20% were used for the experiments. The polydispersity of the colloidal silica particles was greater than 30%.

TABLE 4

| Particle size (nm) | pH | Orientation | Removal rate (nm/hr) | Defectivity |
|---|---|---|---|---|
| 80 | 7 | a-plane | 1530 | N |
| 80 | 9 | a-plane | 1850 | N |
| 80 | 12 | a-plane | 1215 | N |
| 80 | 7 | c-plane | 3075 | N |
| 80 | 9 | c-plane | 4610 | N |
| 80 | 12 | c-plane | 5530 | N |
| 80 | 7 | r-plane | 1650 | N |
| 80 | 9 | r-plane | 2120 | N |
| 80 | 12 | r-plane | 2530 | N |

The results shown in Table 4 evidence that a pH less than 9.0 shown at a pH of 7 gave higher sapphire removal rates compared to higher pH, with no measured defectivity on the sapphire surface for any of the pHs tested.

Example 5: Effect of Substrate Temperature and Slurry Recirculation

This Example evaluated the role of temperature and the effect of recirculation on polishing using an example slurry formulated with coated particles of manganese oxide. For these experiments, a manganese oxide coated colloidal silica based slurry was used to polish sapphire (c-plane and a-plane and r-plane) substrates. The polishing was conducted on a single sided polisher with pressure of 7 psi and pad (12 inch size) rotation of 150 rpm on a Buehler table top polisher. Sapphire substrates of different orientations were polished. A standard suede pad was used for the polishing process. The suede pad has a pore size in the range of 20 to 100 microns. 80 nm particles with polydispersity of greater than 20% were used for the experiments. The pH of the slurry was kept at 9.5 during the polishing process. The polydispersity of the colloidal silica particles was greater than 30%.

TABLE 5

| Particle size (nm) | Substrate Temperature | Orientation | Removal rate (nm/hr) | Defectivity |
|---|---|---|---|---|
| 80 | RT | a-plane | 1250 | N |
| 80 | RT | a-plane | 1540 | N |
| 80 | 30 | a-plane | 1830 | N |
| 80 | 45 | a-plane | 2370 | N |
| 80 | 60 | a-plane | 2850 | N |
| 80 | RT | c-plane | 3560 | N |

TABLE 5-continued

| Particle size (nm) | Substrate Temperature | Orientation | Removal rate (nm/hr) | Defectivity |
|---|---|---|---|---|
| 80 | RT | c-plane | 4130 | N |
| 80 | 30 | c-plane | 4360 | N |
| 80 | 45 | c-plane | 4980 | N |
| 80 | 60 | c-plane | 5860 | N |

The results in Table 5 evidence that increasing the temperature from room temperature (RT) to 60° C. results in a significant increase in sapphire removal rate, while adding recirculation also increases the sapphire removal rate.

Example 6: Effect of Pad Material

The effect of different polishing pad materials were evaluated. For these experiments, colloidal silica based slurry was used to polish sapphire (c-plane and a-plane and r-plane) substrates. The polishing was conducted on a single sided polisher with pressure of 7 psi and suede pad (12 inch size) rotation of 150 rpm on a Buehler table top polisher. Sapphire substrates of different orientations were polished. For the suede pad runs a standard suede pad was used for the polishing process. The "non-suede" pad shown in Table 6 comprised polyurethane. 80 nm particles with polydispersity of greater than 20% were used for the experiments. The pH of the slurry was kept at 8.5 during the polishing process.

TABLE 6

| Particle size (nm) | Pad type | Pore size (um) | Orientation | Removal Rate (nm/hr) | Defectivity |
|---|---|---|---|---|---|
| 80 | Polyurethane | >20 | a-plane | 810 | Y |
| 80 | Suede | 50 | a-plane | 960 | N |
| 80 | Suede | 65 | a-plane | 1230 | N |
| 80 | Suede | 80 | a-plane | 1980 | N |
| 80 | Suede | 100 | a-plane | 2010 | N |
| 80 | Polyurethane | >20 | c-plane | 1870 | N |
| 80 | Suede | 50 | c-plane | 3370 | N |
| 80 | Suede | 65 | c-plane | 3860 | N |
| 80 | Suede | 80 | c-plane | 4290 | N |
| 80 | Suede | 100 | c-plane | 5510 | N |
| 80 | Suede | 50 | r-plane | 1240 | N |
| 80 | Suede | 80 | r-plane | 1570 | N |

A significant finding in this Example is that positively charged polishing pads such as suede poromeric pads with Asker C hardness less than 95 increase the removal rate of sapphire samples as compared to polyurethane pads. As the suede pads are positively charged, they can attract negatively charged particles, in this case silica particles that are negatively charged.

Example 7: Used of Mixed Particle Types

The removal rate of sapphire (a plane and c plane) was monitored by polishing on a Buehler polishing machine. The polishing pressure was 6 psi and the rpm was 150. Slurries containing particles of different compositions were used. Colloidal silica made from sodium silicate process having particle size ranging from 10 nm to 180 nm, with the particle concentration varying from 5 wt. % to 45 wt. %, and surface area varying from 30 $m^2$/gm to 200 $m^2$/gm were mixed with different particles (sol-gel silica with particle size varying from 50 nm to 2 microns, fumed silica with aggregate particle size less than 200 nm and surface area varying from 50 $m^2$/gm to 600 $m^2$/gm, fumed titania, fumed and colloidal alumina particles). The pH of the slurry was varied from 7 to 12. The weight ratio of the non-colloidal particles to colloidal particles was varied between 0.1 wt. % to 30 wt. %, mixing colloidal silica particles with fumed particles with characteristic fractal dimension $D_f$ between 1.5 to 2.8. The primary average particle size of the fumed oxide particles were less than 50 nm, while the average size of the agglomerate was less than 500 nm.

TABLE 7

| Colloidal Silica (mean size and concentration) | 2nd particle | pH | Orientation | Removal Rate | Defectivity | Friction |
|---|---|---|---|---|---|---|
| 80 nm 20% particle | None | 8.0 | c-plane | 1230 | N | 3 |
| 80 nm 20% particle | None | 8.0 | A-plane | 330 | N | 2 |
| 80 nm 15% particle | 3% fumed silica Surface area 300 $m^2$/gm | 10.5 | A-plane | 450 | N | 4 |
| 80 nm 15% particle | 13% fumed silica 90 $m^2$/gm | 8.0 | A-plane | 420 | N | 4 |
| 80 nm 15% particle | 1% fumed silica Df = 1.9 to 2.5 | 8.0 | A-plane | 370 | N | 4 |
| 130 nm fumed 6% | 1% fumed silica with Df = 1.9 to 2.5 | 8.0 | A-plane | 420 | N | 4 |
| 130 nm fumed 6% | 3% Fumed Alumina Df = 1.9-2.5 | 9.0 | A-plane | 270 | Y | 3 |

TABLE 7-continued

| Colloidal Silica (mean size and concentration) | 2nd particle | pH | Orientation | Removal Rate | Defectivity | Friction |
|---|---|---|---|---|---|---|
| 120 nm sol-gel silica | 10% fumed silica Alumina | 11.0 | c-plane | 1560 | N | 4 |
| 80 nm sol-gel silica | 0 | 10.8 | A-plane | 300 | N | 4 |
| 80 nm sol-gel silica | 2.5% fumed silica primary particle <50 nm | 10.6 | A-plane | 420 | N | 4 |

The results shown in Table 7 above evidence that the removal rate and the friction during polishing (measured by temperature rise) increased substantially when fumed silica particles were mixed with colloidal silica particles. The addition of fumed silica particles did not increase the defectivity of the polished sapphire samples.

While various embodiments of the invention have been described above, it should be understood that they have been presented by way of example only, and not limitation. Numerous changes to the disclosed embodiments can be made in accordance with this Disclosure without departing from the spirit or scope of the subject matter disclosed herein. Thus, the breadth and scope of this Disclosure should not be limited by any of the above described embodiments. Rather, the scope of this Disclosure should be defined in accordance with the following claims and their equivalents.

The invention claimed is:

1. A method of chemical mechanical polishing (CMP), comprising:
   providing a slurry including:
   a plurality of colloidal metal oxide or colloidal semiconductor oxide particles (colloidal particles) in water,
   (i) said plurality of colloidal particles having a polydispersity >50% determined by a polydispersity formula for a distribution width (w) involving a first width (w1) at a first particle size and a second width (w2) at a second larger particle size, said polydispersity formula=(w2−w1)×100/dav which includes 63% of a total of said plurality of colloidal particles by volume and said dav is an average particle size of said plurality of colloidal particles, and
   (ii) mixed particle types comprising said plurality of colloidal particles with an average primary particle size >50 nm mixed with fumed oxide particles having an average primary particle size <25 nm, and
   placing a substrate having an alumina surface into a CMP apparatus having a rotating polishing pad, and
   performing CMP with said rotating polishing pad and said slurry to polish said alumina surface.

2. The method of claim 1, wherein said polydispersity is >80%.

3. The method of claim 1, wherein said particle feature includes said (i) and said (ii).

4. The method of claim 1, wherein said alumina surface comprises sapphire, doped sapphire, or AlON.

5. The method of claim 1, wherein said rotating polishing pad comprises a polymeric-based polishing pad.

6. The method of claim 1, wherein a pH of said slurry is >7.

7. The method of claim 1, wherein said particle feature further comprises an organic material which comprises a nitrogen-based organic compound.

8. The method of claim 1, further comprising alkali metal ions in a concentration from 500 ppm to 5 weight %.

9. The method of claim 1, further comprising a coating on said plurality of colloidal particles including at least one of Group I ions, Group II ions, or a transition metal oxide.

10. The method of claim 1, wherein said plurality of colloidal particles have an average surface area per unit mass <100 $m^2$/gm mixed and said fumed oxide particles having an average surface area per unit mass >150 $m^2$/gm.

11. The method of claim 1, wherein said alumina surface comprises a polycrystalline surface.

\* \* \* \* \*